United States Patent [19]

Nozaki et al.

[11] Patent Number: 5,258,157
[45] Date of Patent: Nov. 2, 1993

[54] METHOD FOR JOINING EXTRUDED WEATHER STRIPS AND RESULTING WEATHER STRIP FOR MOTOR VEHICLE

[75] Inventors: Masahiro Nozaki, Ama; Masafumi Moriyama, Inazawa, both of Japan

[73] Assignee: Toyoda Gosei Co., Ltd., Nishikasugai, Japan

[21] Appl. No.: 683,792

[22] Filed: Apr. 11, 1991

[30] Foreign Application Priority Data

Apr. 12, 1990 [JP] Japan .................................. 2-96679

[51] Int. Cl.⁵ .............................................. E06B 7/16
[52] U.S. Cl. ................................... 264/261; 49/479.1; 428/122; 428/358
[58] Field of Search .................. 428/122, 358; 296/93; 264/261; 292/DIG. 70; 49/475, 506, 479.1, 475.1

[56] References Cited

U.S. PATENT DOCUMENTS

| | | | |
|---|---|---|---|
| 4,769,947 | 9/1988 | Ogawa et al. | 49/479.1 |
| 4,769,950 | 9/1988 | Ogawa et al. | 428/122 X |
| 4,884,370 | 12/1989 | Nozaki et al. | 428/122 X |
| 5,035,937 | 7/1991 | Nozaki | 428/122 |
| 5,127,193 | 7/1992 | Okada et al. | 49/506 X |
| 5,154,952 | 10/1992 | Nozaki | 296/93 X |

FOREIGN PATENT DOCUMENTS 63-290714  11/1988  Japan ........................ 428/122

Primary Examiner—Henry F. Epstein
Attorney, Agent, or Firm—Cushman, Darby & Cushman

[57] ABSTRACT

A method for joining extruded weather strip portions by molding and the resulting weather strip for a motor vehicle. Ends of the extruded weather strip portions, each of which has a trim portion from which a plurality of flange retaining lips project obliquely inwardly, are placed in spaced side by side relation. A core plate having thick portions which are longitudinally spaced apart from each other are inserted into ends of the trim portions of the extruded weather strips so that the thick portions press the flange retaining lips against opposed inner surfaces of the ends of the trim portions, the ends of the extruded weather strip portions together with the core plate are positioned in a cavity of a mold, and a molding material is injected into the cavity of the mold to form a molded joining portion which joins the extruded weather strip portions. Then, the mold is opened and the core plate is removed from the molded joining portion.

6 Claims, 5 Drawing Sheets

PRIOR ART

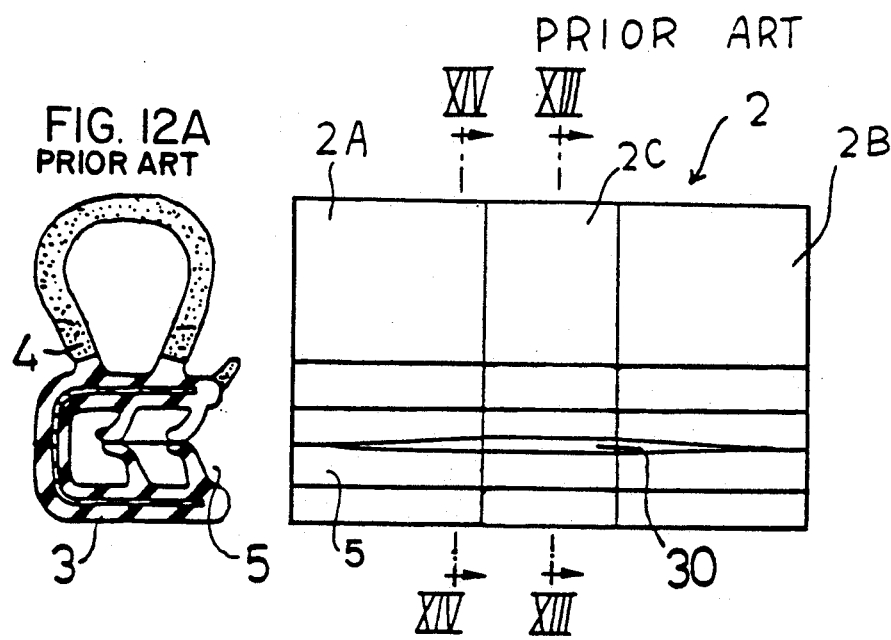
FIG. 12A PRIOR ART
FIG. 12B PRIOR ART
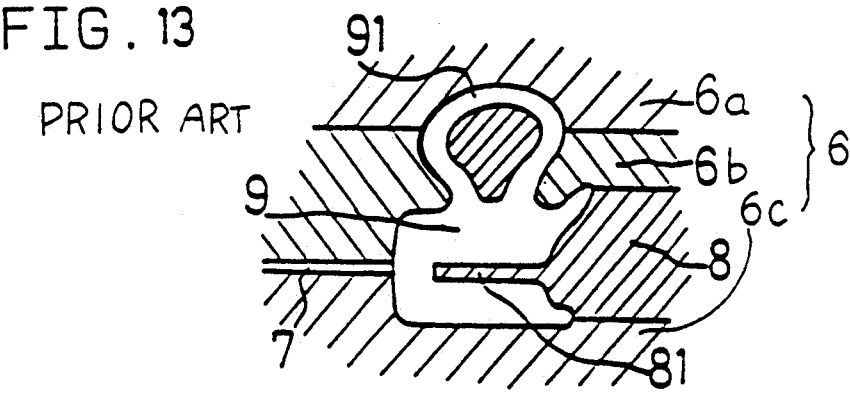
FIG. 13 PRIOR ART
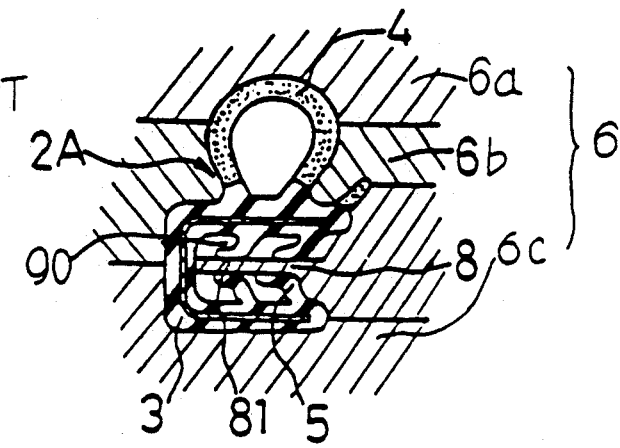
FIG. 14 PRIOR ART

METHOD FOR JOINING EXTRUDED WEATHER STRIPS AND RESULTING WEATHER STRIP FOR MOTOR VEHICLE

BACKGROUND OF THE INVENTION

1. Field of the Invention

The present invention relates to a weather strip for a motor vehicle having a molded joining portion, and a method for forming that weather strip by joining extruded weather strip portions with the molded joining portion.

2. Description of the Prior Art

In a motor vehicle, as shown in FIG. 10, a body flange is formed around a door opening 1 of the vehicle body, and a weather strip is attached to this body flange.

FIGS. 11 and 12 illustrate one example of a conventional weather strip for attachment to the body flange of a motor vehicle. Weather strip 2 is composed of extruded weather strip portions 2A, 2B and a joining portion 2C which joins the extruded weather strip portion 2A, 2B at the portion A of FIG. 10. This joining portion 2C is generally formed by molding (U.S. Pat. No. 4,884,370).

Each of the extruded weather strip portions 2A, 2B has a trim portion 3 having a U-shaped cross-section and a tubular sealing portion 4 which projects from one side surface of the trim portion 3. An insert 35 is embedded in the trim portion 3. Flange retaining lips 5 project obliquely inwardly from opposed inner surfaces of the trim portion 3 for retaining the body flange of the vehicle body.

FIG. 12 illustrates a bottom side of the molded joining portion 2C of the weather strip 2, and FIGS. 13 and 14 illustrate a cross-section of a mold for forming the joining portion 2C taken along the lines XIII—XIII and lines XIV—XIV, respectively of FIG. 12.

The trim portion of the molded joining portion 2C has no flange retaining lips. A slit 30 into which the body flange of the motor vehicle is to be inserted, opens from the bottom of the molded joining portion 2C.

The slit 30 is formed by a core plate 8 during molding. The core plate 8 has a flat board like flange portion 81 having a thickness corresponding to the body flange.

In order to join the weather strip portions 2A, 2B, ends of these weather strip portions 2A, 2B are spaced apart by a predetermined amount. Then, both ends of the flange portion 81 of the core plate 8 are respectively inserted into the trim portions 3 of the weather strip portions 2A, 2B. FIG. 14 illustrates the state where one end of the flange portion 81 of the core plate 8 is inserted into the trim portion 3 of the weather strip portions 2A.

Ends of the extruded weather strip portions 2A, 2B are mounted on the mold 6 with the core plate 8 positioned in a cavity 9 of the mold 6, as shown in FIG. 13. This cavity 9 is defined by mold members 6a, 6b, 6c of the mold 6. A rubber material is injected into the cavity 9 from a gate 7 provided between the mold members 6b, 6c. Thus, the joining portion 2C joining the weather strips 2A, 2B is molded.

In the conventional joining method, between the flange portion 81 of the core plate 8 and the facing inner surfaces of the trim portions 3 of the extruded weather strip portions 2A, 2B, openings 90 are formed on both sides of the flange retaining lips 5, as shown in FIG. 14. These openings 90 communicate with the cavity 9 of the mold 6 so that a portion of the rubber material injected into the cavity 9 flows out of the cavity 9 into openings 90.

The flow of the rubber material into these openings 90 causes a shortage of the rubber material within the cavity 9 so that the rubber material tends not to reach a narrow part 91 (FIG. 13) of the cavity 9, which is far from the gate 7. As a result in the resulting weather strip may be separated at the joints between the molded joining portion and the ends of the extruded weather strip portions.

SUMMARY OF THE INVENTION

It is an object of the present invention to provide a weather strip which is inseparably joined by a molded joining portion, and a method for forming such a weather strip, whereby molding material sufficiently reaches every part of a cavity, and inseparably joins the extruded weather strip portions.

In accordance with the present invention, a core plate having thick portions which are longitudinally spaced from each other is used in molding. The core plate having these thick portions is forcibly inserted into the respective ends of the trim portions of the extruded weather strip portions while pressing the flange retaining lips against opposed inner surfaces of the trim portions. Then, ends of the extruded weather strip portions together with the core plate are inserted in a cavity of a mold, and a joining portion is molded between the ends of the extruded weather strip portions. The resulting joining portion has an H-shaped slit opening in the bottom thereof.

At ends of the respective extruded weather strip portions, the flange retaining lips are pressed on the facing inner surfaces of the respective trim portions by the thick portions of the core plate. Accordingly, both ends of the cavity of the mold are closed by the flange retaining lips, without leaving any opening. As a result, the molding material is prevented from flowing out of the cavity and thus the molding material reaches every part of the cavity. Therefore, the resulting weather strip is prevented from being separated at the joints between the molded joining portion and the ends of the extruded weather strip portions.

By making the thickness of an intermediate portion between the thick portions of the core plate slightly less than the body flange, the width of the slit formed in the trim portion of the molded joining portion can be made less than the thickness of the body flange, and accordingly the resulting weather strip can be attached to the body flange more securely.

In this case, the body flange can be easily inserted into this thin slit by elastically deforming the walls surrounding the thin slit because no insert is embedded in the trim portion of the molded joining portion. This elastic deformation of the wall causes the generation of a counter force. By virtue of the counter force, the molded joining portion is stably attached to the body flange.

In accordance with the present invention, the molding material injected into the mold is not wasted so that the amount of the molding material can be decreased. and the injection pressure can be reduced.

BRIEF DESCRIPTION OF THE DRAWING

Other objects, features and characteristics of the present invention will become apparent upon consideration of the following description and the appended claims with reference to the accompanying drawings, all of which form a patent of this specification.

FIG. 1 is a bottom view of a first embodiment of a weather strip in accordance with the present invention;

FIG. 12 is a bottom view of a conventional weather strip having a molded joining portion;

FIG. 12A is a cross-sectional end view of the weather strip of FIG. 12;

FIG. 13 is a cross-sectional view of a conventional mold for forming the conventional weather strip, which is taken along the line XIII—XIII of FIG. 12; and FIG. 14 is a cross-sectional view of a conventional mold for forming the conventional weather strip, which is taken along the line XIV—XIV of FIG. 12.

DETAILED DESCRIPTION OF THE PRESENTLY PREFERRED EXEMPLARY EMBODIMENTS

A first embodiment of the present invention will be explained with reference to FIGS. 1 through 5.

Figures 1A, 1B:
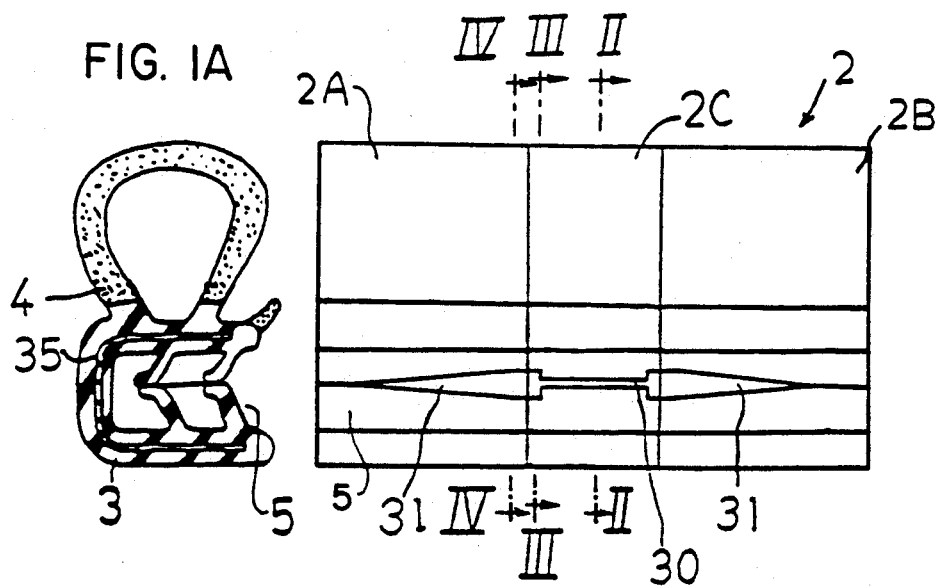
FIG. 1A is a cross-sectional end view of the weather strip of FIG. 1.
Figure 2:
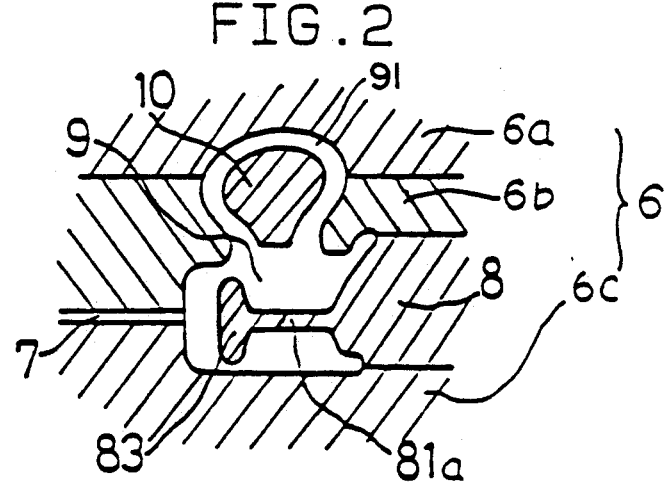
FIG. 2 is a cross-sectional view of a mold for forming a joining portion of the weather strip taken along the line II—II of FIG. 1.
Figure 3:
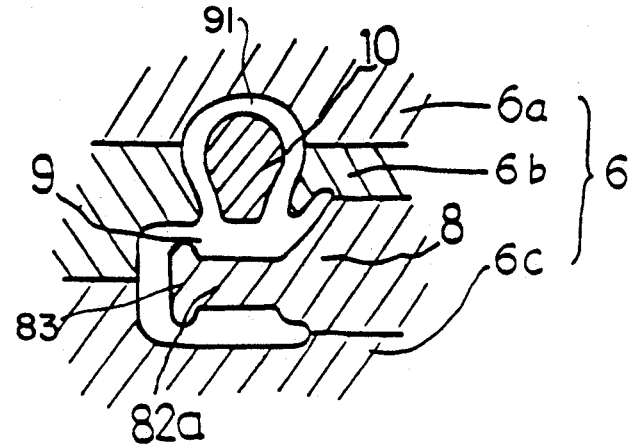
FIG. 3 is a cross-sectional view of a mold for forming the joining portion of the weather strip taken along the line III—III of FIG. 1.
Figure 4:
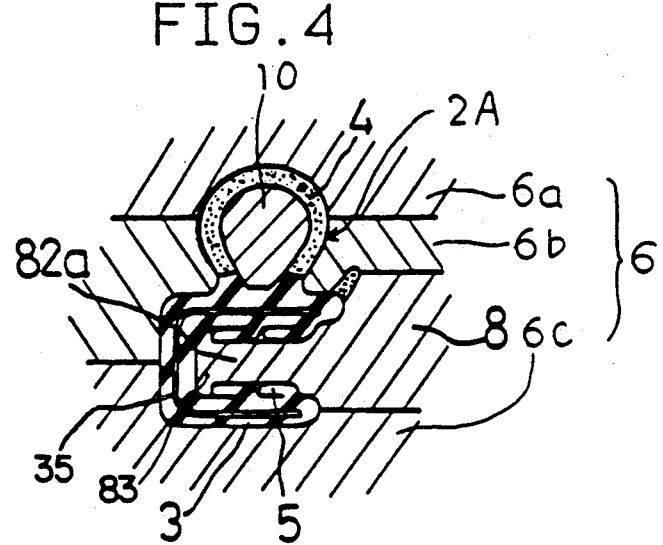
FIG. 4 is a cross-sectional view of a mold for forming the joining portion of the weather strip taken along the line IV—IV of FIG. 1.

FIG. 1 illustrates a weather strip having a molded joining portion. FIGS. 2, 3, and 4 are respectively cross-sectional views of a mold for forming the weather strip of FIG. 1, which are respectively taken along the lines II—II, III—III, IV—IV of FIG. 1, and FIG. 5 is a perspective view of a core plate used in the method of the present invention.

In FIG. 1, extruded weather strip portions 2A, 2B are joined by a molded joining portion 2C. Each of the weather strip portion 2A, 2B has a trim portion 3 made of solid rubber and a tubular sealing portion 4 made of sponge rubber. The trim portion 3 has a U-shaped cross-section, and an insert 35 is embedded therein. Flange retaining lips 5 project inwardly from facing inner surfaces of the trim portion 3.

To join the weather strip portions 2A, 2B by molding, ends of the weather strip portions 2A, 2B are spaced apart by a predetermined amount. A core plate 8 is interposed between these weather strip portions 2A and 2B with both ends thereof inserted into the respective trim portions 3 of the weather strip portions 2A, 2B.

Figure 5:
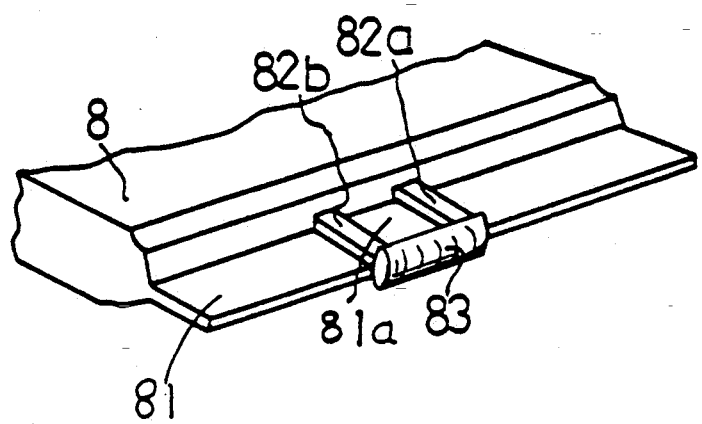
FIG. 5 is a perspective view of a core plate.

As shown in FIG. 5, a flange portion 81 having a thickness substantialy the same as that of the body flange, is formed at an edge of the core plate 8. Thick portions 82a and 82b are formed in this flange portion 81 in spaced apart relationship. The intermediate portion 81a between these thick portions 82a and 82b has a thickness slightly less than that of the body flange. This intermediate portion 81a forms a slit 30 (FIG. 1) into which the body flange is inserted. At an edge of this intermediate portion 81a, a thick portion 83 is formed.

These thick portions 82a and 82b are forcedly inserted into the ends of the trim portions 3 of the weather strips 2A, 2B while pressing the flange retaining lips 5 against the opposed inner surfaces of the trim portion 3. End portions outside of the thick portions 82a and 82b of the core plate 8 have a thickness substantially equal to the body flange, and only slightly press the flange retaining lips 5 toward the opposed inner surfaces of the trim portions 3. FIG. 4 illustrates the state of the end of the extruded weather strip 2A, into which the thick portion 82a of the core plate 8 is inserted.

The extruded weather strip portions 2A, 2B together with the core plate 8 are mounted on a lower mold member 6c of a mold 6. The ends of the extruded weather strips, into which the thick portions 82a and 82b of the core plate 8 are inserted, are positioned on both ends of a cavity 9 of the mold 6.

As shown in FIGS. 2 and 3, the intermediate thin portion 81a of the core plate 8 is positioned at a center of the cavity 9. Reference numeral 10 designates a core for forming a tubular sealing portion 4 of the molded joining portion 2C.

Next, a middle mold member 6b and an upper mold member 6a are mounted on the lower mold member 6a, thereby closing the mold 6. Then, solid rubber material which is softer than that of the trim portion 3, is injected into the cavity 9 from the gate 7. Thus, the molded joining portion 2C which joins the weather strip portions 2A, 2B is formed. After molding, the core plate 8 and the core 10 are removed from the resulting weather strip.

The molded joining portion 2C has a narrow slit 30 into which the body flange is inserted, as shown in FIG. 1. This slit 30 is of a nearly H-shape and opens in the bottom side of the trim portion 3 of the molded joining portion 2C. Both ends of the slit 30 are formed by the thick portions 82a and 82b of the core plate 8. Accordingly, both ends of the slit 30 have a width greater than the intermediate portion thereof.

At the ends of the extruded weather strip portions 2A, 2B, to which the ends of the molded joining portion are joined, the flange retaining lips 5 come into close contact with the inner surfaces of the trim portions 3. At their juncture with the joining portion 2c, the folded back flange retaining lips 5 adhere to the joining portion 2c even after the core plate 8 is removed. These flange retaining lips 5 gradually returns to their original posture as being apart from the molded joining portion 2C. Therefore, in the bottom of the respective ends of the extruded weather strip portions 2A and 2B, triangular slits 31 are formed.

In accordance with the joining method of the present invention, the molding material is prevented from flowing out of the cavity 9. As a result, the molding material sufficiently reaches every part of the cavity 9 including the narrow part 91 for forming the sealing portion. Therefore, the molded joining portion 2C is securely joined with the respective extruded weather strip portions 2A, 2B.

In addition, the intermediate portion 81a between the thick portions 82a and 82b of the core plate 8 has a thickness less than the body flange so that the intermediate portion of the resulting slit 30 in the molded joining portion 2C has a width less than the thickness of the body flange, thereby ensuring the molded joining portion will be securely attached to the body flange.

The thick portion 83 provided in the core plate 8 serves to form a sealer reservoir at an inside end of the slit 30 of the molded joining portion 2C as well as to close the space between the upper inner surface of the trim portion 3 and the end of the body flange.

FIGS. 6 through 9 illustrate a second embodiment of the present invention.

In the second embodiment, ends of two extruded weather strip portions 2A, 2B are joined through a curved joining portion 2C. This curved joining portion 2C is attached to a corner portion of a vehicle body.

In the present embodiment, the core plate 8 and the core 10 each have a curved configuration conforming to the corner portion of the vehicle body. The remaining method of the second embodiment is substantially the same as that of the first embodiment.

Figure 6:
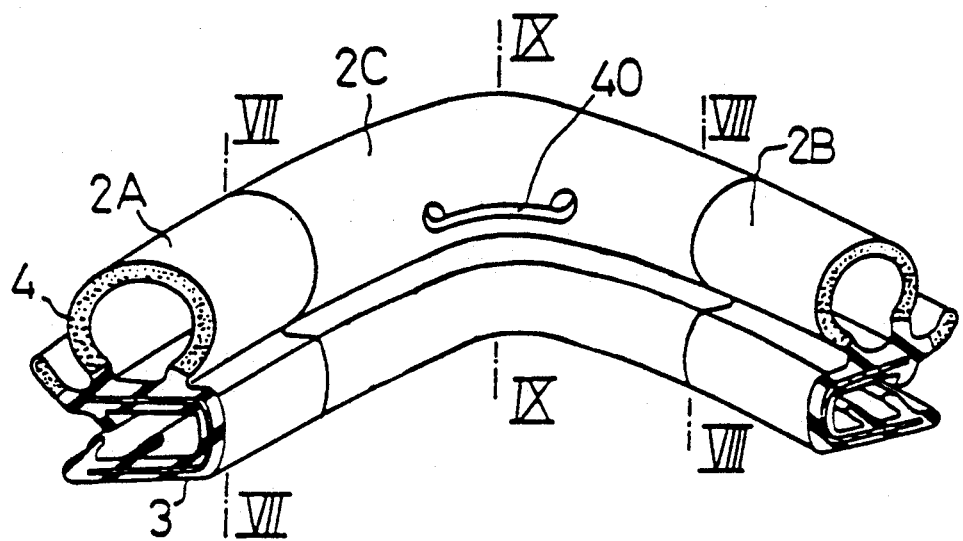
FIG. 6 is a partially sectioned perspective view of a second embodiment of the weather strip in accordance with the present invention.
Figure 7:
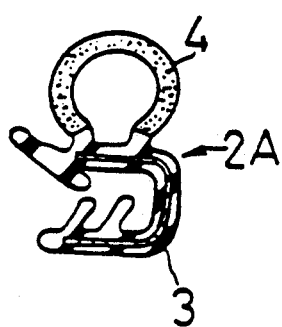
FIG. 7 is a cross-sectional view taken along the line VII—VII of FIG. 6.
Figure 8:
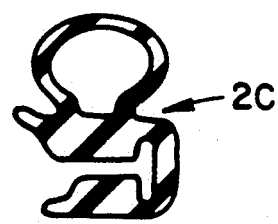
FIG. 8 is a cross-sectional view taken along the line VIII—VIII of FIG. 6.
Figure 9:
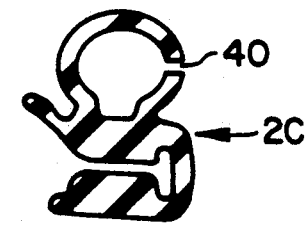
FIG. 9 is a cross-sectional view taken along the line IX—IX of FIG. 6.
Figure 10:
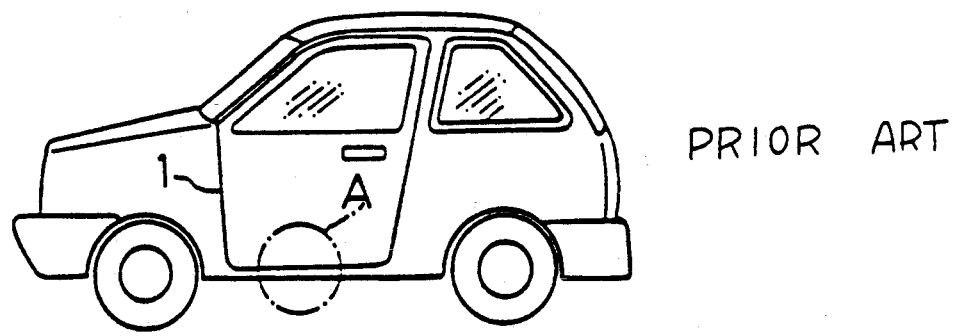
FIG. 10 is a side view of a motor vehicle.
Figure 11:
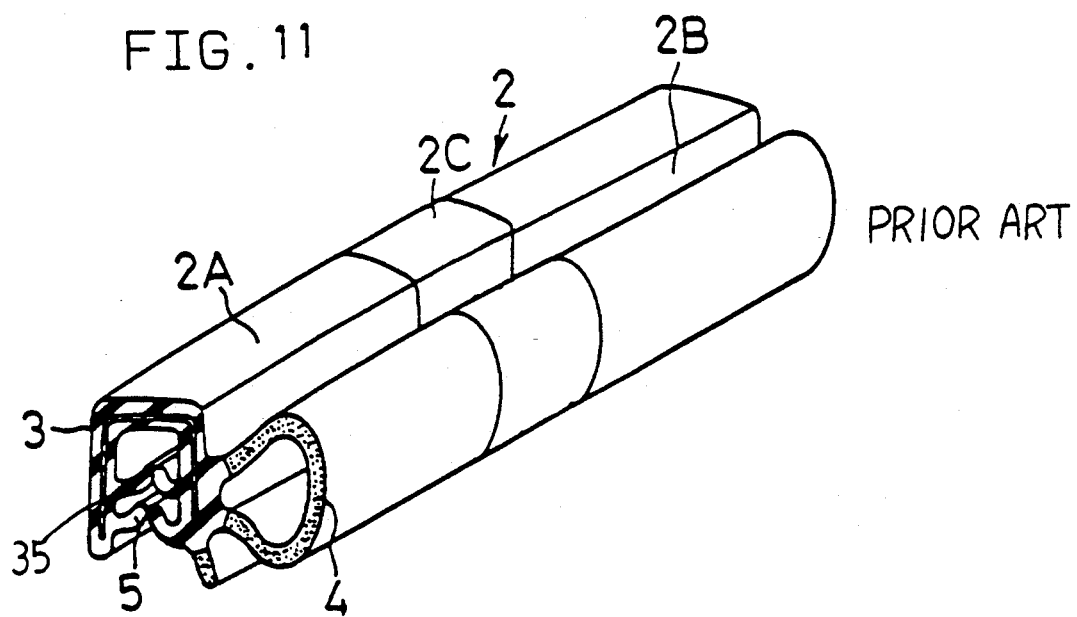
FIG. 11 is a perspective view of the conventional weather strip having a molded joining portion, which is attached along a door opening of a motor vehicle.

In FIGS. 6 and 9, reference numeral 40 designates a slit for removing the core 10 from the molded joining portion 2C.

The present invention is not limited to the joining of the weather strips for a door opening which is provided with a sealing portion 4 on one side surface of the trim portion 3. The present invention is widely applicable to the joining of weather strip portions, each being provided with a U-shaped trim portion having flange retaining lips.

What is claimed is:

1. A method for joining extruded weather strip portions for a motor vehicle by molding, each said extruded weather strip portion having a trim portion of a generally U-shaped cross section, a tubular sealing portion projecting outwardly from an outer surface of said trim portion, and a plurality of flange retaining lips for retaining a body flange of the motor vehicle, said flange retaining lips projecting inwardly from opposed inner surfaces of said trim portion, said method comprising the steps of:

spacing ends of said extruded weather strip portions which are to be joined, to effect a predetermined space between said ends;

pressing said flange retaining lips against said opposed inner surfaces of each said trim portion at the respective ends of said extruded weather strip portions by inserting between the opposed inner surfaces of said trim portions first and second spaced core plate portions separated by said predetermined space, said first and second core plate portions being part of a core plate having between said first and second core plate portions a middle section which is thinner than said first and second portions;

positioning said ends of said extruded weather strip portions together with said inserted core plate in a cavity of a mold;

injecting a molding material into said cavity of said mold for forming a molded joining portion which joins said ends of said extruded weather strip portions with a gap between said ends which corresponds in thickness to the thickness of said middle section of said core plate; and opening said mold and removing said core plate from said molded joining portion.

2. The method according to claim 1, wherein said step of spacing comprises placing said extruded weather strip portions including a trim portion having a tubular sealing portion in said mold cavity, and said step of positioning comprises positioning in said mold cavity which has a molding surface which substantially conforms to an outer surface of each of said extruded weather strip portions, said core plate being positioned at a center of one part of said cavity, which forms said trim portion, and a core being inserted in another part of said cavity, which forms said tubular sealing portion.

3. The method according to claim 2, wherein said trim portion of each of said extruded weather strip portions is made of solid rubber, said tubular sealing portion thereof is made of sponge rubber, and said molding material is composed of solid rubber softer than that of said trim portion of each of said extruded weather strip portions.

4. A method as in claim 1, wherein a thickness of said core plate between said first and second thick portions is less than the thickness of said core plate first and second thick portions.

5. A method for joining vehicle weather strips end to end by molding a joining section between spaced opposing ends of said weather strips, each of said weather strips having a trim portion of generally U-shaped cross-section and a plurality of vehicle body flange retaining lips projecting inwardly from opposed inner surfaces of said trim portion, said method comprising:

placing said opposing ends in a molding cavity with a core plate inserted into and extending between said opposing ends, injecting molding material into said cavity to form said joining section, and blocking said molding material from flowing into either of said opposing ends, said step of blocking including pressing said flange retaining lips against said opposed inner surfaces by inserting into said opposing ends a said core plate having first and second spaced-apart, relatively thick portions and a relatively thin portion extending between said thick portions, each said thick portion being inserted into a said opposing end to urge said flange retaining lips of said trim portion thereof against the opposed inner surfaces of said trim portion thereof and removing said core plate from said molded joining section.

6. A method as in claim 5, wherein said step of blocking further includes filling a gap between an innermost of said lips and an inside bottom surface of each said U-shaped trim portion by inserting a said core plate having an enlarged nose portion at least at distal ends of said relatively thick portions and sized so as to correspond to said gap.

* * * * *